8530X
J. H. Chandler,
Mortising Machine.
Patented Dec. 17, 1834.
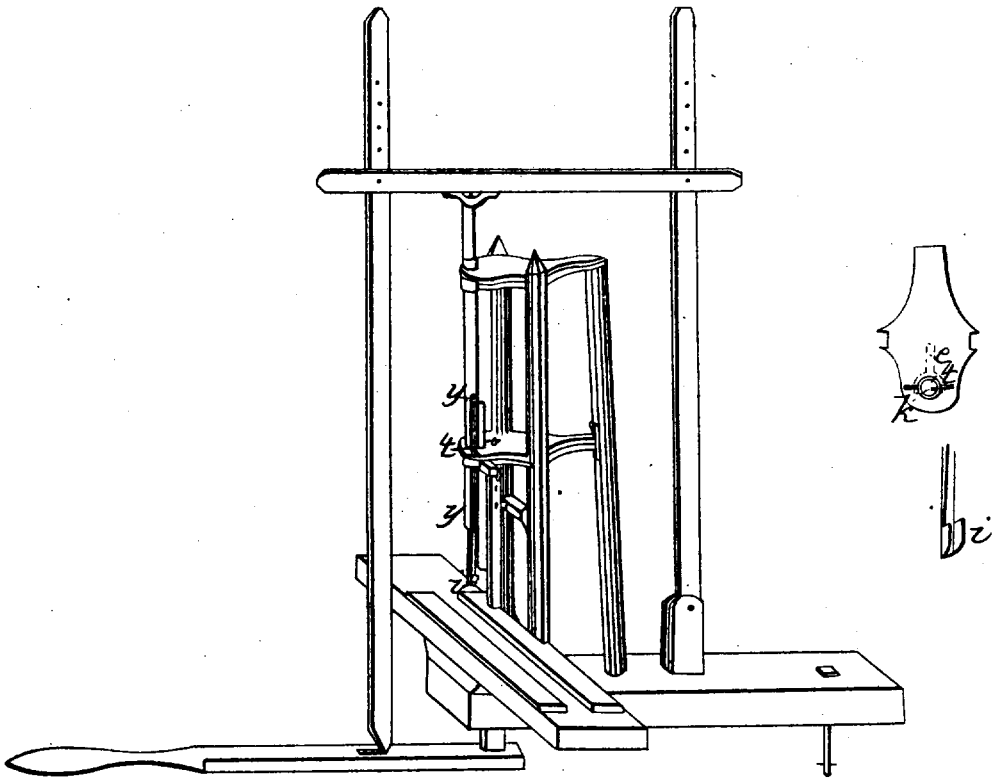
AM. PHOTO-LITHO. CO. N.Y. (OSBORNE'S PROCESS)

Dec 17. 1834

John H. Chandler. Worcester. Massachusetts.

The Schedule referred to in these Letters Patent, and making
part of the same containing a description in the words of the said
John Hapsall Chandler himself of his Improvement in the construc
tion of machines for Morticing.

To all People to whom these presents shall come.
Be it known that I John Hapsall Chandler, of Worcester, in the
County of Worcester and Commonwealth of Massachusetts, Mech
anic, have invented a new and useful improvement in the
construction of Machines for Morticing, and that the following
is a full and exact description of the same as invented or
improved by me—
The Machines heretofore used for making mortices, have been
attended with these difficulties. The piston or shaft holding the
Chissel has been so imperfectly supported or guided, that it was
liable to be removed from its right position, thereby making
the mortice irregular or out of square, and in order to remedy
this evil, the piston has been so closely confined that the oper
ation of the machine has been greatly embarrassed by too great
friction. Another inconvenience has also arisen from the use
of Common Chisels, which leave the chips in the mortice, and
much time is required in removing them. All these inconveniences
are removed by constructing the machine after the manner
proposed by me which is as follows:
The frame of the machine may be constructed of wood or
iron, or any suitable material. My machine is partly of firm
hard wood and partly of iron. A plank of convenient dimen
sions compose the foundation of the frame. Near the front
end of the plank, are erected three posts of wood, the
feet of the two front ones, are [illegible] into the plank [illegible]

the third one stands back between them, and is tenoned
into it. The posts are firmly connected by rails, and plates or
castings. These castings are of a triangular form, and connected
to the posts at the angles. One of these irons is near the top, and
the other is placed about one third of the distance from the
top downwards towards the bottom. The front end of these
triangular pieces of iron, are circular, projecting out in front
of the two front posts. A hole is made thro' each of these at
the end, in the centre, as near the end as will answer. Through
these holes passes the piston which holds the chisel in a socket
at the lower end. The piston is moveable up and down through
the holes made in the castings mentioned above. On one side of
the piston, and half the length of it, is cut a groove. On the
upper side of the lower plate or casting, and directly back of
the piston, is a spring, the back end of which is made fast to
the casting, the other end is made forked, the legs of the fork
passing each side of the piston. Directly beneath the forks of
the spring, is an iron ring passing round the piston, and on the
inside of it, is a tooth, or projecting piece of iron fitted to move
in the groove in the piston. This ring has two stems or handles
attached to it, for the purpose of turning the piston. The ends of
the handles as they pass round under the spring, are made to fall
into a notch on the right hand side of the casting. A little below
the lower casting is framed into the posts a narrow rail for the pur-
pose of receiving a screw. Below this, close down on the plank is an-
other, to assist in holding the posts together and confining them to it.
In front of the feet of the two front posts, is firmly confined a
plank resting upon, and attached to the foundation of the fram
or machine, crosswise by means of a bolt. Upon this cross piece are
two slides parallel to each other, and moveable at pleasure, with
slots and screws to confine them. On the back slide is erected a
standard extending up to the screw passing through the narrow said mentioned above and confined to it. passing through the
foundation. cross piece and slide. on the right hand side. and accom
modated with a screw to confine it at pleasure. is an iron holder
with a head. on the front side of it. Back of the third post. are
firmly set two short standards. with a space between them. In this
space is fastened by a pin. the lower end of a shaft, which extends
up somewhat higher than the posts. in the centre and directly
underneath the cross piece. is firmly set a tenon. attached to this
at the end in a mortice. by a pin. is, a lever with a handle turned
on the end of it. Near the end of this lever towards the machine,
is fastened by a hing. another shaft of the same size and hight
of the other. From the top of these shafts downwards. are inserted, at
short distance apart five holes. attached to the upper end of these
shafts. is another lever. by means of mortices and pins at the end
On the under side of this lever. and at a short distance from the
front end. is placed a hinge. to which is attached the upper
end of the piston, This lever is moveable up and down on the
pin holes. the chisel is accommodated with two lips which.
in addition to making the sides of the mortice smooth. does. by
pressing the chips between them. bring them out of the mortice.
The machine may be operated upon a common work bench
it being confined to it by means of a bolt—

Explanation of the Drawing

A. Plank or foundation of the Machine. B. Cross piece. d.d. two
front posts. S. post back of the two front ones. K. triangular
piece of iron. for connecting the posts. and guiding the piston. m.m.
(another similar piece for the same purpose. o. end of the forked spring.
t. iron ring with a stem or handle for turning the piston. O.S. piston
holding the chisel. z.z. groove in the piston. g. holder to prevent the
piece. while mortising. from rising. p. Standard moved at the top
by the screw P. C.C. chisel inserted into the lower end of the piston
a.a. Slides between which the piece to be mortised, is placed. n standards inserted into the foundation of the machine, u. upright shaft moveable on a pin at x. t. upper lever moveable on a pin at each end, h. front shaft. w. lever connected by a pin to the tenon v. with the plank A. z bolt or screw to confine the machine to the bench v. handle of the lever

Operation of the Machine

The operator takes the piece to be morticed in his left hand, and lays it on the cross piece on the left hand side of the piston between the two slides a.a. He then with his right hand takes hold of the lever w. at the handle v, and by raising it, the shaft being connected to it by a hinge and the upper lever t. to the shaft h. by a pin and the piston being connected to the lever t. are raised also. He then moves the piece under the chisel where the mortice is to be made. He then adjusts the slides and standard, by confining them with the screws in such a position as will bring the chisel exactly between the guage strokes of the mortice. He then brings his hand against the standard, to feed the chisel, and then bears down upon the lever at v, and the chisel is made to cut down the depth required, and by means of the lips or lateral edges of the chisel, the chips are brought out of the mortice. This operation is repeated until the mortice is extended to the desired point in one direction, when the operator turns the piston half round and with it the chisel, to present the chisel in a proper manner for the other end of the mortice. this operation is performed by taking hold of the stem t, in the ring which passes round the piston, and carrying it round upon the opposite side where it falls into a notch in the triangular casting R. and is confined in its proper position by the legs of the forked spring c. The piston is moved round by the stem or handle t. by means of the tooth attached to the inside of the ring, and lying in the groove [illegible] of the piston. All I claim as my invention or improvement, is the groove in the piston, with the forked spring, and ring with tooth and

129.

handle for turning it. with the application also of a chisel with lateral edges.

In testimony that the above is a true specification of my said improvement, I have hereunto set my hand this twenty ninth day of August one thousand eight hundred and thirty four.

Witnesses
Chas. C. Baldwin
T. J. Farnsworth
Chs. Wheelock

John H. Chandler

Exd. [illegible]

(1729 Words)

Drawing

Patented December 17th 1834.